United States Patent
Polania Castro

(10) Patent No.: US 11,392,941 B2
(45) Date of Patent: Jul. 19, 2022

(54) SYSTEM AND METHOD FOR SECURING A PRIVATE KEY TRANSACTION WITHIN BLOCKCHAIN

(71) Applicant: Honda Motor Co., Ltd., Tokyo (JP)

(72) Inventor: Boris Hernan Polania Castro, Cupertino, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 211 days.

(21) Appl. No.: 16/689,595

(22) Filed: Nov. 20, 2019

(65) Prior Publication Data

US 2021/0073794 A1 Mar. 11, 2021

Related U.S. Application Data

(60) Provisional application No. 62/897,572, filed on Sep. 9, 2019.

(51) Int. Cl.
*G06Q 20/38* (2012.01)
*G06Q 20/36* (2012.01)
*G06Q 20/42* (2012.01)
*G06Q 20/06* (2012.01)

(52) U.S. Cl.
CPC ..... *G06Q 20/3829* (2013.01); *G06Q 20/0652* (2013.01); *G06Q 20/3674* (2013.01); *G06Q 20/425* (2013.01)

(58) Field of Classification Search
None
See application file for complete search history.

(56) References Cited

U.S. PATENT DOCUMENTS

| | | | |
|---|---|---|---|
| 9,391,782 B1* | 7/2016 | Mironenko | H04L 9/3247 |
| 9,818,092 B2 | 11/2017 | Pennanen | |
| 9,898,782 B1 | 2/2018 | Winklevoss et al. | |
| 10,990,935 B1* | 4/2021 | Hayes | G06Q 20/28 |
| 11,127,000 B2* | 9/2021 | Pogorelik | H04L 9/0643 |
| 2016/0085955 A1 | 3/2016 | Lerner | |
| 2016/0162897 A1 | 6/2016 | Feeney | |
| 2017/0109715 A1 | 4/2017 | Aguirre et al. | |
| 2017/0293899 A1* | 10/2017 | Furche | H04L 63/062 |
| 2019/0034920 A1* | 1/2019 | Nolan | H04L 9/0894 |
| 2019/0095910 A1* | 3/2019 | Gumowski | G06Q 20/3823 |
| 2020/0184467 A1* | 6/2020 | Segaran | G06Q 20/36 |

FOREIGN PATENT DOCUMENTS

| | | | |
|---|---|---|---|
| WO | 2018022132 | 2/2018 | |
| WO | WO-2019204213 A1 * | 10/2019 | H04L 9/0877 |

OTHER PUBLICATIONS

"Cryptocurrency wallet," retrieved from https://en.wikipedia.org/w/index.php?title=Cryptocurrency_wallet&oldid=871147917, all pages. (Year: 2018).*

* cited by examiner

*Primary Examiner* — Jacob C. Coppola
(74) *Attorney, Agent, or Firm* — Rankin, Hill & Clark LLP

(57) ABSTRACT

A system and method for securing a private key transaction within blockchain that include receiving an input for initiating a financial transaction between a sender and a recipient. The system and method also include processing a secure wallet that includes transaction data associated with the financial transaction. The system and method additionally include generating a private key for the sender and a private key for the recipient. The system and method further include communicating the transaction data to complete the financial transaction using the blockchain.

20 Claims, 4 Drawing Sheets

SYSTEM AND METHOD FOR SECURING A PRIVATE KEY TRANSACTION WITHIN BLOCKCHAIN

CROSS-REFERENCE TO RELATED APPLICATION

This application claims priority to U.S. Provisional Application Ser. No. 62/897,572 filed on Sep. 9, 2019, which is expressly incorporated herein by reference.

BACKGROUND

Many individuals are increasing utilizing electronic systems to complete monetary transactions between one another and between themselves and vendors, retailers, banking instructions and the like. In many of the transactions blockchain technology may be used to complete the transactions. The blockchain technology may include blocks that may store information about transactions that may include the participants of the transaction (e.g., user 1 and user 2, user 1 and vendor), date, time, and dollar amount of each transaction. When a block is added to the blockchain it may become publicly available for anyone to view. Each computer in a blockchain network has its own copy of the blockchain. Accordingly, there may be a large amount of copies of the same blockchain. Much of the burden for ensuring that each financial transaction is secure is placed upon one type of technology that may be utilized by the blockchain such as the completion of digital signatures.

BRIEF DESCRIPTION

According to one aspect, a computer-implemented method for securing a private key transaction within blockchain that includes receiving an input for initiating a financial transaction between a sender and a recipient. The computer-implemented method also includes processing a secure wallet that includes transaction data associated with the financial transaction. The computer-implemented method additionally includes generating a private key for the sender and a private key for the recipient. The private keys are securely exchanged for secure validation of the financial transaction. The computer-implemented method further includes communicating the transaction data to complete the financial transaction using the blockchain.

According to another aspect, a system for securing a private key transaction within blockchain that includes a memory storing instructions when executed by a processor cause the processor to receive an input for initiating a financial transaction between a sender and a recipient. The instructions also cause the processor to process a secure wallet that includes transaction data associated with the financial transaction. The instructions additionally cause the processor to generate a private key for the sender and a private key for the recipient. The private keys are securely exchanged for secure validation of the financial transaction. The instructions further cause the processor to communicate the transaction data to complete the financial transaction using the blockchain.

According to yet another aspect, a non-transitory computer readable storage medium storing instructions that when executed by a computer, which includes a processor perform a method that includes receiving an input for initiating a financial transaction between a sender and a recipient. The method also includes processing a secure wallet that includes transaction data associated with the financial transaction. The method additionally includes generating a private key for the sender and a private key for the recipient. The private keys are securely exchanged for secure validation of the financial transaction. The method further includes communicating the transaction data to complete the financial transaction using the blockchain.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
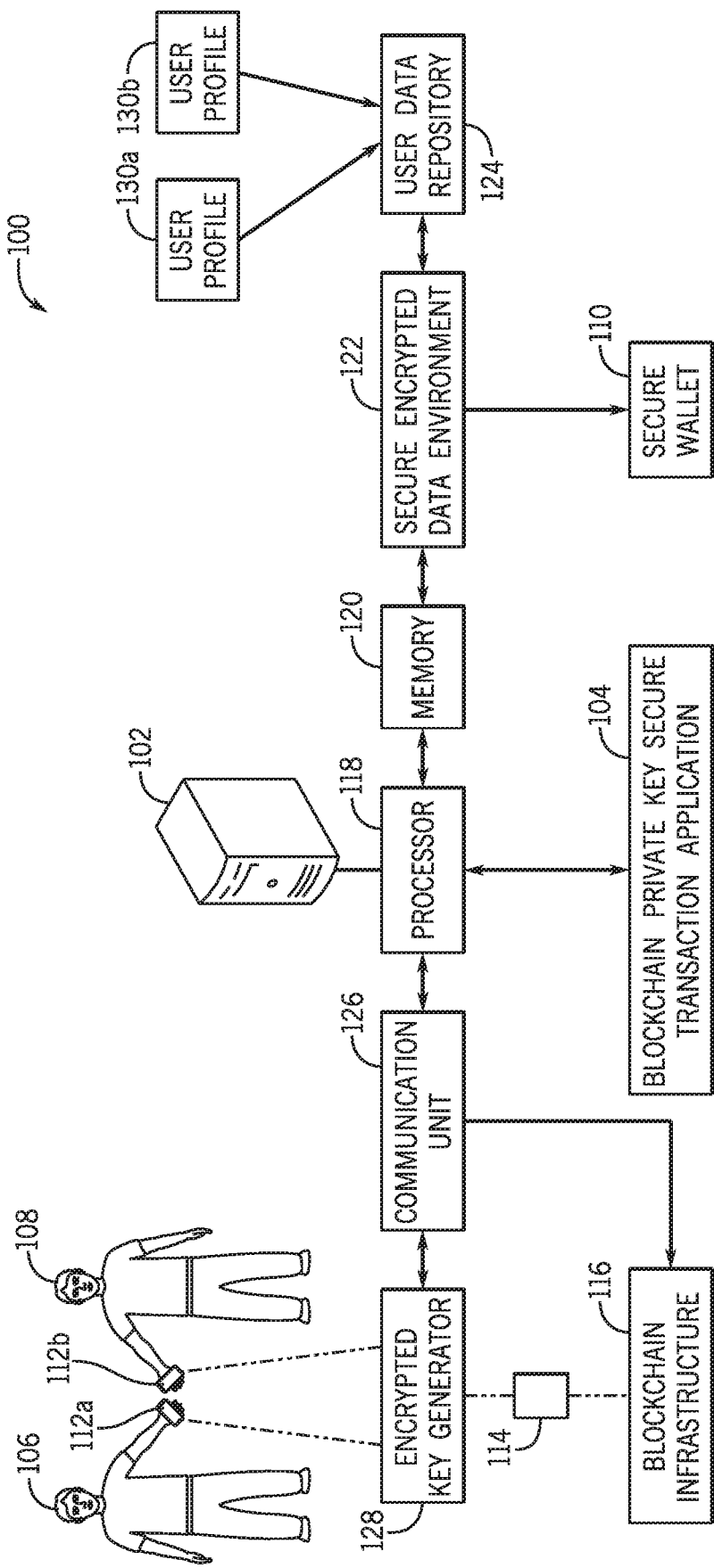
FIG. 1 is a schematic view of an exemplary operating environment for securing a private key transaction within blockchain according to an exemplary embodiment of the present disclosure.

The following includes definitions of selected terms employed herein. The definitions include various examples and/or forms of components that fall within the scope of a term and that can be used for implementation. The examples are not intended to be limiting.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols such as Controller Area network (CAN), Media Oriented System Transport (MOST), Local Interconnect Network (LIN), among others.

"Computer communication," as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

An "input device," as used herein may include devices for controlling different vehicle features which include various vehicle components, systems, and subsystems. The term "input device" includes, but it not limited to: push buttons, rotary knobs, and the like. The term "input device" additionally includes graphical input controls that take place within a user interface which may be displayed by various types of mechanisms such as software and hardware based controls, interfaces, or plug and play devices.

A "memory," as used herein may include volatile memory and/or nonvolatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

A "module," as used herein, includes, but is not limited to, hardware, firmware, software in execution on a machine, and/or combinations of each to perform a function(s) or an action(s), and/or to cause a function or action from another module, method, and/or system. A module may include a software controlled microprocessor, a discrete logic circuit, an analog circuit, a digital circuit, a programmed logic device, a memory device containing executing instructions, and so on.

An "operable connection," as used herein may include a connection by which entities are "operably connected", is one in which signals, physical communications, and/or logical communications may be sent and/or received. An operable connection may include a physical interface, a data interface and/or an electrical interface.

An "output device," as used herein may include devices that may derive from vehicle components, systems, subsystems, and electronic devices. The term "output devices" includes, but is not limited to: display devices, and other devices for outputting information and functions.

A "processor," as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

I. System Overview

Referring now to the drawings, wherein the showings are for purposes of illustrating one or more exemplary embodiments and not for purposes of limiting the same, FIG. 1 is a schematic view of an exemplary operating environment 100 for securing a private key transaction within blockchain according to an exemplary embodiment of the present disclosure. In an exemplary embodiment, the operating environment 100 may include a secure server infrastructure (secure server) 102 that may be configured execute a blockchain private key secure transaction application (secure transaction application) 104. As discussed below, the secure transaction application 104 may enable enhanced secure financial transactions between a sender 106 (senders, users, persons initiating electronic sending of funds) and a recipient 108 (users, beneficiaries, vendors, retailers, banking instructions, etc.).

As discussed in more detail below, the secure transaction application 104 may be configured to receive an input that may be provided by the sender 106 to initiate a financial transaction between the sender 106 and the recipient 108 of funds. The secure transaction application 104 may be configured to process a secure wallet 110 (e.g., virtual wallet, virtual secure account) that may be stored in a secured location, as discussed below. The secure transaction application 104 may additionally be configured to collect funds from the sender 106 that may be stored within the secure wallet 110.

The secure transaction application 104 may be additionally configured to generate a private encrypted data key (private key) 112a that may be assigned to the sender 106 of the funds and a private key 112b that may be assigned to the recipient 108 of the funds. Each of the private keys 112a, 112b may be encrypted with a numerical encrypted key code or alpha-numerical encrypted key code that may not be publically accessible. As discussed below, the private keys 112a, 112b may be exchanged as ownership credentials to securely validate the financial transaction between the sender and the recipient.

In one embodiment, the secure transaction application 104 may also be configured to generate a public key 114 that may be passed to the blockchain technology provider(s) (not shown) through a blockchain infrastructure 116. The public key 114 may include basic information pertaining to the account information that may be utilized by the blockchain technology provider(s) to pass the financial transaction through a blockchain technology via the blockchain infrastructure 116 to complete the financial transaction in an encrypted and secure manner using blockchain.

With particular reference to FIG. 1, the secure server 102 may include a processor 118. The processor 118 may operably control one or more components of the secure server 102. In an exemplary embodiment, the processor 118 may be configured to execute the secure transaction application 104. The processor 118 may be configured to execute one or more operating systems, financial system and subsystem executable instructions, and the like. The processor 118 may also include respective internal processing memory, an interface circuit, and bus lines for transferring data, sending commands, and communicating with the plurality of components of the secure server 102.

In one embodiment, the processor 118 may be operably connected to a memory 120 of the secure server 102. The memory 120 may be configured to store data files associated with one or more applications, operating systems, financial systems, financial system user interfaces, including but not limited to data files of the secure transaction application 104. In one embodiment, the memory 120 may be configured to store a secure encrypted data environment 122 of the secure transaction application 104. The secure encrypted data environment 122 may be configured as an encrypted data store that may be accessible based on a selectively and randomly encrypted passcode that may be processed by the processor 118 at one or more periods of time (e.g., every thirty seconds).

The secure encrypted data environment 122 may be utilized as an encrypted data container that may allow the secure transaction application 104 to securely store one or more secure wallets 110 that are associated with respective financial transactions. Each respective secure wallet 110 may be configured as an encrypted data packet that may store transaction data that may include, but may not be limited to, a monetary transfer amount, account information, wiring information, routing information, and the like associated with the financial transaction from the sender 106 to the recipient 108. As discussed below, the secure transaction application 104 may be configured to access the secure encrypted data environment 122 to store one or more secure wallets 110 that are processed by the application 104. The application 104 may also access the respective secure wallets 110 once secure validation is completed based on an exchange of the private keys 112*a*, 112*b*.

In an exemplary embodiment, the memory 120 may additionally be configured to store a user data repository 124. The user data repository 124 may include data that pertains to one or more users that may utilize the secure transaction application 104 to securely complete financial transactions. Upon the sender 106 initially utilizing the secure transaction application 104 to initiate a financial transfer, the secure transaction application 104 may present a user profile setup user interface that may be presented to the sender 106 and/or the recipient 108 during an initial usage and/or one or more subsequent usages of the secure transaction application 104.

The user profile setup user interface may be utilized to input profile information associated with the sender's name, address, banking institution(s), and the like. The user interface may also allow the recipient 108 to link one or more bank accounts to the secure transaction application 104. Similarly, the secure transaction application 104 may present a user interface to the recipient 108 via a portable device (not shown) or computing infrastructure (not shown) used by the recipient 108 to input profile information associated with the recipient's name, address, banking institution(s), and the like. Accordingly, user profiles 130*a*, 130*b* respectively associated with the sender 106 and the recipient 108 may be respectively populated with data that pertains to information associated with one or more financial accounts (e.g., bank account numbers, fund account information), wiring information, routing information, transfer timeframe information, and the like.

The user profile 130*a* associated with the sender 106 may also include sender identification (e.g., name, address, phone number(s) of the sender 106). Similarly, the user profile 130*b* associated with the recipient 108 may include also recipient information (e.g., name, address, phone number(s) of recipient 108). As discussed below, the user profiles 130*a*, 130*b* associated with the sender 106 and the recipient 108 may be accessed to utilize the information stored within the user profiles 130*a*, 130*b* during a fulfillment of one or more secure transactions between the sender 106 and the recipient 108. For example, such information may be securely stored and utilized when processing the public key 114 to thereby populate the public key 114 that may be passed to the blockchain upon the secure exchange of private keys 112*a*, 112*b* that are assigned to the sender 106 and the recipient 108.

With continued reference to the secure server 102, the processor 118 of the secure server 102 may also be operably connected to a communication unit 126. The communication unit 126 may include one or more network interface cards (not shown) that may be configured to connect to one or more computing systems through an internet cloud (not shown). Such computing systems may include, but may not be limited to, portable devices used by the sender 106 and the recipient 108 and/or computing equipment used by the sender 106 and the recipient 108. In one embodiment, the secure transaction application 104 may be configured to utilize the communication unit 126 to present the user interface of the application 104 to the sender 106 and/or the recipient 108 upon receiving an input from the sender 106 to initiate a financial transfer of funds to the recipient 108.

The user interface may be utilized during an initial use of the secure transaction application 104 to input profile information associated with the sender's and recipient's name, address, banking instruction(s), and the like. The user interface may also allow the sender 106 and/or the recipient 108 to link one or more respective bank accounts to the secure transaction application 104. During the initial and subsequent uses of the secure transaction application 104 the user interface may allow the sender 106 to input a monetary transfer amount (e.g., dollar amount) that the sender 106 may wish to transfer. The secure transaction application 104 may also present the transfer amount inputted by the sender 106 to the recipient 108 to accept or deny the transfer. If the transfer is accepted by the recipient 108, the secure transaction application 104 may be configured to process the secure wallet 110, as discussed below.

In one or more embodiments, the secure transaction application 104 may include an encrypted key generator 128. The encrypted key generator 128 may be configured to generate the private key 112*a* that may be associated with the sender 106 and the private key 112*b* that may be associated with the recipient 108. The encrypted key generator 128 may process the private keys 112*a*, 112*b* with a numerical encrypted key code (e.g., n digit alpha-numeric code) or alpha-numerical encrypted key code that may not be publically accessible.

The private keys 112*a*, 112*b* may be exchanged as ownership credentials to securely validate the financial transaction between the sender 106 and the recipient 108 without each of them being able to access the private keys 112*a*, 112*b*. In one configuration, the secure transaction application 104 may utilize the communication unit 126 to transfer the sender's private key 112*a* to the recipient 108 to be authenticated without the recipient 108 being able to access the sender's private key 112*a*. Likewise, the secure transaction application 104 may utilize the communication unit 126 to transfer the recipient's private key 112*b* to the sender 106 to be accepted and authenticated without the sender 106 being able to access the recipient's private key 112*b*.

In one configuration, the encrypted key generator 128 may also be configured to process the public key 114 that may be passed to the blockchain technology provider(s) through the blockchain infrastructure 116. The public key 114 may include basic information pertaining to account information using an elliptical curve process. In one configuration, the public key 114 may include selected information (e.g., encrypted financial data) from the private keys 112*a*, 112*b* and may be utilized by the blockchain technology provider(s) to pass the financial transaction through a blockchain technology to complete the financial transaction in an encrypted and secure manner using the blockchain.

In one or more embodiments, the blockchain infrastructure 116 may be configured to include one or more externally hosted computing systems that may be owned, operated, and/or hosted by one or more blockchain technology providers. In one embodiment, upon securely validating the financial transaction between the sender 106 and the recipient 108, the secure transaction application 104 may utilize the communication unit 126 to transfer the public key 114 and transaction data associated with the financial transaction to the blockchain infrastructure 116 to pass the financial transaction through a blockchain technology and to complete the financial transaction in an encrypted and secure manner using blockchain.

II. The Private Key Secure Transaction Application and Methods Executed by the Application The secure transaction application 104 and its components will now be discussed in more detail according to an exemplary embodiment and with continued reference to FIG. 1. In one or more embodiments, the secure transaction application 104 may be stored on the memory 120 of the secure server 102 and may be executed by the processor 118 of the secure server 102. In another embodiment, the secure transaction application 104 may be stored on an externally hosted server infrastructure (not shown) or one or more computing systems of the blockchain infrastructure 116 and may be accessed by the secure server 102 through the communication unit 126 to be executed by the processor 118 of the secure server 102. In yet some additional embodiments, the secure transaction application 104 may be stored on the secure server 102, one or more computing devices of the blockchain infrastructure 116, and/or the portable device and/or computing infrastructure used by the sender 106 and/or the recipient 108.

Figure 2:
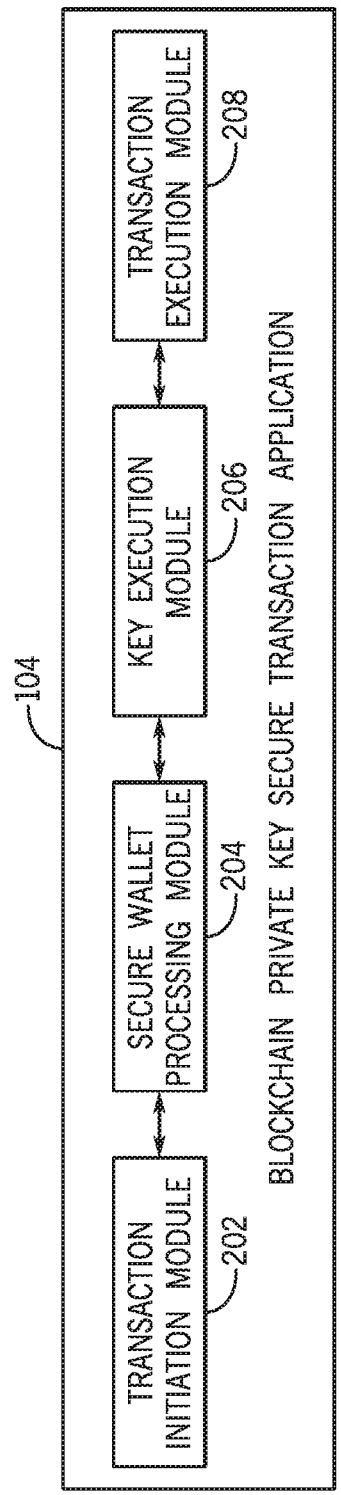
FIG. 2 is a schematic view of a plurality of modules of the secure transaction that may execute computer-implemented instructions for securing a private key transaction within blockchain according to an exemplary embodiment of the present disclosure.

FIG. 2 is a schematic view of a plurality of modules 202-208 of the secure transaction application 104 that may execute computer-implemented instructions for securing a private key transaction within blockchain according to an exemplary embodiment of the present disclosure. In an exemplary embodiment, the plurality of modules 202-208 may include a transaction initiation module 202, a secure wallet processing module 204, a key execution module 206, and a transaction execution module 208. It is appreciated that the secure transaction application 104 may include one or more additional modules and/or sub-modules that are included in addition to or in lieu of the modules 202-208.

In an exemplary embodiment, the transaction initiation module 202 of the secure transaction application 104 may be configured to present a secure transaction initiation user interface that may be utilized by the sender 106 and/or the recipient 108 to initiate a secure transaction through the secure transaction application 104. In particular, the secure transaction initiation user interface may be presented to the sender 106 (e.g., through the senders portable device) to initiate a financial transaction (e.g., that is initiated by the sender 106) that may be utilized to securely transfer an amount of funds to the recipient 108. Upon the sender 106 inputting an input user interface icon that may be presented as part of the secure transaction initiation user interface to initiate the secure financial transaction, the secure financial transaction initiation user interface may be presented to the recipient 108 (e.g., through the recipient's portable device) to accept or reject (e.g., through the presentation of respective user interface imputable icons) the initiation of the financial transaction. In one embodiment, the transaction initiation module 202 may determine when the sender 106 initiates a financial transaction of funds and when the recipient 108 accepts the initiation of the financial transaction of funds from the sender 106 to the recipient 108.

In another embodiment, in circumstances in which the recipient 108 would like to initiate a request to receive funds from the sender 106 (e.g., for a transaction, for a debt, etc.), the secure transaction initiation user interface may be utilized by the recipient 108 to invite the sender 106 to initiate the financial transaction of funds between the sender 106 and the recipient 108. In particular, based on an input of an initiation user input icon, the secure transaction initiation user interface may be presented to the recipient 108 to send a transaction initiation invitation (e.g., through the recipient's portable device) to initiate a financial transaction of a particular monetary amount that may be utilized to securely transfer the particular monetary amount of funds (e.g., dollar amount) to the recipient 108 from the sender 106.

Upon the recipient 108 inputting an input user interface icon that may be presented as part of the secure transaction initiation user interface to send the transaction initiation invitation, the secure financial transaction initiation user interface may be presented to the sender 106 (e.g., through the sender's portable device) to accept or reject (e.g., through the presentation of respective user interface imputable icons) the initiation of the financial transaction of the particular monetary amount. In one embodiment, the transaction initiation module 202 may thereby determine when the recipient 108 inputs the invitation for the initiation of a secure transaction of funds to the sender 106 and if the sender 106 accepts the invitation to initiate the secure transaction of funds from the sender 106 to the recipient 108.

In one or more embodiments, during initial and subsequent uses of the secure transaction application 104, the secure financial transaction initiation user interface may allow the sender 106 to input a monetary transfer amount or edit the monetary transfer amount that may be pre-inputted based on the acceptance of the recipient's transaction initiation invitation. Accordingly, the monetary amount of funds that the sender 106 may wish to transfer to the recipient 108 may be determined by the transaction initiation module 202. Upon the determination of the transfer amount that the sender 106 may wish to securely transfer to the recipient 108, the transaction initiation module 202 may be configured communicate data pertaining to the initiation of the secure transaction between the sender 106 and the recipient 108 and the monetary transfer amount to the secure wallet processing module 204, the key execution module 206, and the transaction execution module 208 of the secure transaction application 104.

In an exemplary embodiment, the secure wallet processing module 204 of the secure transaction application 104 may be configured to process a secure wallet 110 that may be utilized to complete the secure transaction between the sender 106 and the recipient 108. In one configuration, upon the sender 106 initiating the secure transaction, the secure wallet processing module 204 may be configured to process the secure wallet 110 that may be associated with the particular secure transaction between the sender 106 and the recipient 108. In one embodiment, upon processing the secure wallet 110 associated with the secure transaction between the sender 106 and the recipient 108, the secure wallet processing module 204 may be configured to access the secure encrypted data environment 122 stored on the memory 120 to analyze the user profiles that may be associated with the sender 106 and the recipient 108.

The secure wallet processing module 204 may be configured to retrieve information from the respective user profiles and may thereby populate the secure wallet 110 with information that may be retrieved from the respective user profiles that are associated with the sender 106 and the recipient 108. Such information may include, but may not be limited to, information associated with one or more financial accounts (e.g., bank account numbers, fund account information), wiring information, routing information, sender identification (e.g., name, address, phone number(s) of the sender 106), recipient information (e.g., name, address, phone number(s) of the recipient 108), and the like that may be utilized as transaction information.

In one embodiment, upon processing and populating the secure wallet 110 associated with the secure transaction between the sender 106 and the recipient 108, the secure wallet processing module 204 may be configured to access the secure encrypted data environment 122 stored on the memory 120 of the secure server 102. Upon accessing the secure encrypted data environment 122, the secure wallet processing module 204 may be configured to store the secure wallet 110 within the secure encrypted data environment 122.

In an exemplary embodiment, upon processing and storing the secure wallet 110 the secure wallet processing module 204 may be configured to collect transaction information associated with the particular secure transaction between the sender 106 and the recipient 108. As discussed above, the secure encrypted data environment 122 may be configured as an encrypted data store that may be accessible based on a selectively and randomly encrypted passcode that may be processed by the processor 118 of the secure server 102 at one or more periods of time (e.g., every thirty-seconds).

Also as discussed, during initial and subsequent uses of the secure transaction application 104, the secure financial transaction initiation user interface may allow the sender 106 to input a monetary transfer amount or edit the monetary transfer amount that may be pre-inputted based on the acceptance of the recipient's transaction initiation invitation. Accordingly, the monetary amount of funds that the sender 106 may wish to transfer to the recipient 108 may be determined by the transaction initiation module 202. Upon the determination of the transfer amount that the sender 106 may wish to securely transfer to the recipient 108, the transaction initiation module 202 may be configured communicate data pertaining to the initiation of the secure transaction between the sender 106 and the recipient 108 and the monetary transfer amount to the secure wallet processing module 204. Accordingly, the secure wallet processing module 204 may be configured to determine transaction information associated with the sender 106 and the recipient 108 and the monetary transfer amount that the sender 106 may wish to securely send to the recipient 108 based on communication received by the transaction initiation module 202.

In one or more embodiments, the secure wallet processing module 204 may additionally be configured to access the secure encrypted data environment 122 to an analyze the user profiles 130a, 103b respectively associated with the sender 106 and the recipient 108. As discussed above, the user profiles 130a, 130b may be respectively populated with data that pertains to information associated with one or more financial accounts (e.g., bank account numbers, fund account information), wiring information, routing information, transfer timeframe information, and the like. The secure wallet processing module 204 may be configured to retrieve the information that may be associated with the one or more financial accounts, wiring information, routing information, transfer timeframe information and the like associated with the sender 106 and the recipient 108.

In one embodiment, upon determining the monetary transfer amount and retrieving banking information from the user profiles 130a, 130b, the secure wallet processing module 204 may be configured to store the monetary transfer amount and retrieving banking information as transaction information within the secure wallet 110. Accordingly, the secure wallet 110 may include transaction information that pertains to the secure transaction between the sender 106 and the recipient 108. Upon storing the transaction information associated with the secure transaction, the secure wallet processing module 204 may communicate data pertaining to the processing and updating of the secure wallet 110 to the key execution module 206 of the secure transaction application 104.

In an exemplary embodiment, the key execution module 206 may be configured to utilize the encrypted key generator 128 to generate a private key 112a for the sender 106 and a private key 112b for the recipient 108. The generation of the private keys 112a, 1122b may include computer processing of two separate private encrypted data key packets that may be encrypted with a numerical key code or alpha-numerical key code. In one embodiment, upon the generation of the respective private keys 112a, 112b, the key execution module 206 may be configured to execute the exchange of the private keys 112a, 112b as ownership credentials to securely validate the financial transaction between the sender 106 and the recipient 108.

The private keys 112a, 112b, may be exchanged as ownership credentials and such an exchange may be utilized by the secure transaction application 104 to securely validate the financial transaction as a secure transaction between the sender 106 and the recipient 108. In one configuration, the private keys 112a, 112b may not be visible to the sender 106 and the recipient 108. Accordingly, the key execution module 206 may be configured to utilize the exchange of the private keys 112a, 112b between the sender 106 and the recipient 108 without each of them being able to view the private keys 112a, 112b.

The private keys 112a, 112b may be exchanged as ownership credentials to securely validate the financial transaction between the sender 106 and the recipient 108. In particular, the key execution module 206 may utilize the communication unit 126 of the secure server 102 to transfer the sender's private key 112a to the recipient 108 electronically as encrypted application data. The key execution module 206 may also utilize the communication unit 126 to transfer the recipient's private key 112b to the sender 106 electronically as encrypted application data.

In one embodiment, upon the successful exchange of private keys 112a, 112b between the sender 106 and the recipient 108, through the secure transaction application 104, the key execution module 206 may be configured to present private key exchange confirmation user interfaces to the sender 106 and the recipient 108 through respective portable devices and/or computing infrastructure used by the sender 106 and the recipient 108. The key execution module 206 may also be configured to encrypt the respective private keys 112a, 112b to financial records that are associated with the financial transaction between the sender 106 and the recipient 108.

In an exemplary embodiment, upon the exchange of the private keys 112a, 112b and the encrypting of the private keys 112a, 112b to the financial records, the key execution module 206 may communicate respective data pertaining to the successfully exchange of the private keys 112a, 112b to the transaction execution module 208. Upon determining the successful exchange of private keys 112a, 112b respectively associated with the sender 106 and the recipient 108 and the encryption of the private keys 112a, 112b to the financial records associated with the financial transaction between the sender 106 and the recipient 108, the transaction execution module 208 may be configured to determine that the financial transaction is securely validated and may designate the financial transaction as a secure transaction between the sender 106 and the recipient 108. The transaction execution module 208 may thereby communicate transaction data to the blockchain to allow the blockchain technology to mine the transaction and verify it towards payment.

In particular, once the private keys 112a, 112b are exchanged, the transaction execution module 208 may be configured to communicate with the processor 118 to receive the randomly encrypted passcode that may be utilized as a particular instance of time to access the secure encrypted data environment 122. Upon accessing the secure encrypted data environment 122, the transaction execution module may be configured to access the secure wallet 110 previously processed and stored on the secure encrypted data environment by the secure wallet processing module 204. The transaction execution module 208 may be configured to analyze the secure wallet 110 to obtain the transaction data (e.g., monetary amount to be transferred) previously stored upon the secure wallet 110 by the secure wallet processing module 204 to be further communicated to the blockchain technology provider(s) through communications between the communication unit 126 of the secure server 102 and the blockchain infrastructure 116. Upon accessing and analyzing the secure wallet 110 and obtaining the transaction data, the transaction execution module 208 may communicate data pertaining to the transaction data to the key execution module 206.

In one embodiment, the key execution module 206 may be configured to utilize the encrypted key generator 128 to process a public key 114 that may be passed to the blockchain technology provider(s) through the blockchain infrastructure 116. The public key may include information pertaining to account information associated with the sender 106 and/or the recipient 108 which may be encrypted using an elliptical curve process. In one configuration, the public key may include some select information (e.g., user information) from the private keys 112a, 112b and may be passed to the blockchain infrastructure 116 based on utilization of the communication unit 126 by the key execution module 206. Upon the generation of the public key 114 by the encrypted key generator 128, the key execution module 206 may store the public key on the secure encrypted data environment 122 and may communicate data pertaining to the storage of the public key 114 to the transaction execution module 208.

In an exemplary embodiment, the transaction execution module 208 may be configured to communicate with the processor 118 to receive the randomly encrypted passcode that may be utilized as a particular instance of time to access the secure encrypted data environment 122. Upon accessing the secure encrypted data environment 122, the transaction execution module 208 may retrieve the public key 114 and may utilize the communication unit 126 of the secure server 102 to communicate the transaction data and public key to the blockchain infrastructure 116.

Accordingly, transaction data associated with the financial transaction between the sender 106 and the recipient 108 may be further verified through the blockchain technologies to complete the secure transaction and secure payment of funds from the sender 106 to the recipient 108. The blockchain infrastructure 116 may communicate a confirmation to the transaction execution module 208 of the blockchain verification. Upon the receipt of the confirmation, the transaction execution module 208 may confirm the transaction has been securely completed. Accordingly, the secure transaction application 104 may ensure that the secure transaction between the sender 106 and the recipient 108 is securely validated from an initiation point to a final payment point.

Figure 3:
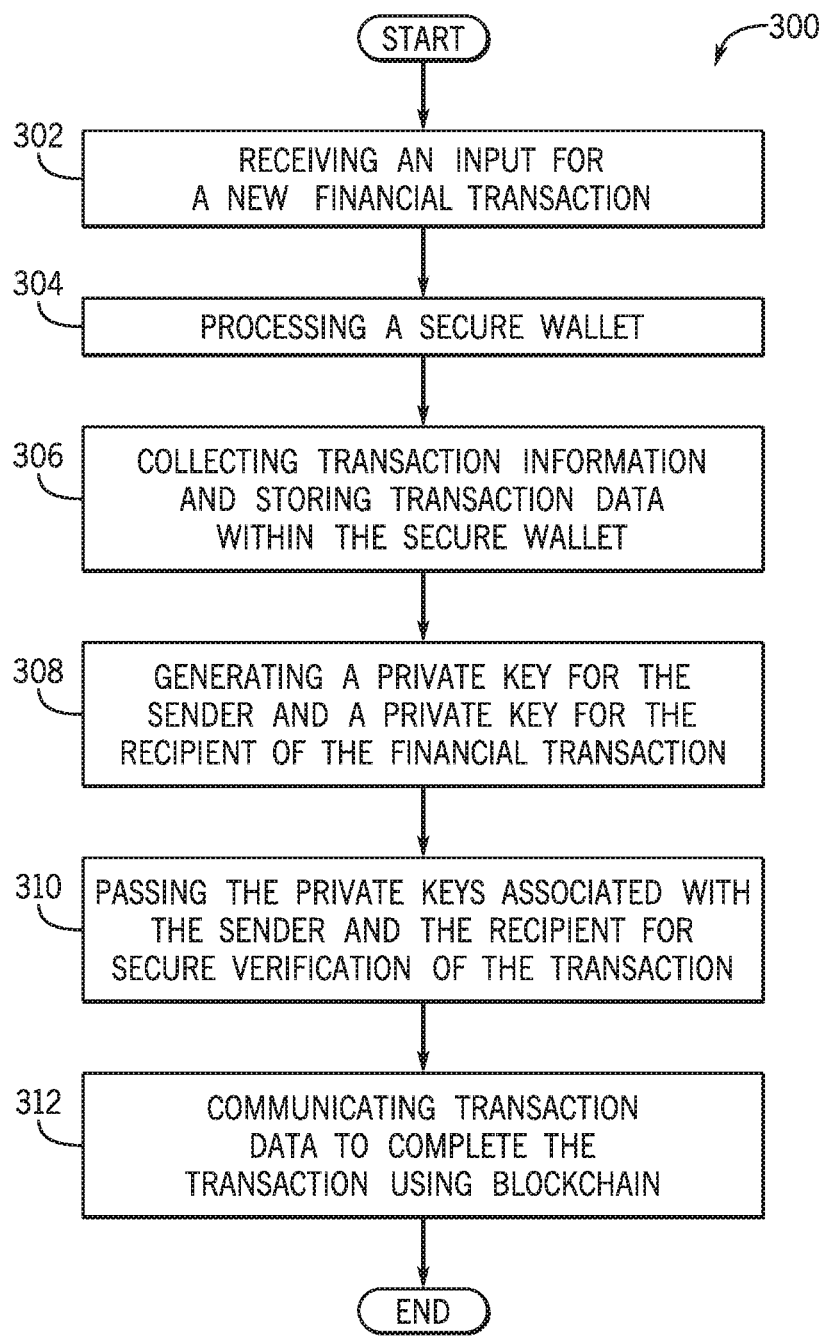
FIG. 3 is a process flow diagram of a method for securing a financial transaction between a sender and a recipient according to an exemplary embodiment of the present disclosure.

FIG. 3 is a process flow diagram of a method 300 for securing a financial transaction between the sender 106 and the recipient 108 according to an exemplary embodiment of the present disclosure. FIG. 3 will be described with reference to the components of FIG. 1 and FIG. 2, through it is appreciated that the method 300 of FIG. 3 may be used with additional and/or alternative system components. The method 300 may begin at block 302, wherein the method 300 may include receiving an input for a new financial transaction.

As discussed above, the transaction initiation module 202 of the secure transaction application 104 may be configured to present a secure transaction initiation user interface that may be utilized by the sender 106 and/or the recipient 108 to initiate a secure transaction. During the initial and subsequent uses of the secure transaction application 104, the secure transaction initiation user interface may allow the sender 106 to input a monetary transfer amount (e.g., dollar amount) that the sender 106 may wish to transfer to the recipient 108. In some configurations, the transaction initiation module 202 may also present the transfer amount inputted by the sender 106 or the recipient 108 to accept or deny the transfer of funds.

The method 300 may proceed to block 304, wherein the method 300 may include processing a secure wallet 110. In an exemplary embodiment, upon the initiation of the financial transaction between the sender 106 and the recipient 108, the secure wallet processing module 204 may be configured to process the secure wallet 110 that may be associated with the particular financial transaction. As discussed above, the secure wallet 110 may be configured as an encrypted data packet that may store transaction data associated with funds that may be transferred from the sender 106 to the recipient 108. In one embodiment, upon processing the secure wallet 110, the secure wallet processing module 204 may be configured to store the secure wallet 110 within the secure encrypted data environment 122 stored on memory 120 of the secure server 102 to be subsequently accessed upon secure validation of the financial transaction.

The method 300 may proceed to block 306, wherein the method 300 may include collecting transaction information and storing transaction data within the secure wallet 110. In one embodiment, the secure wallet processing module 204 may be configured to collect transaction information associated with the monetary transfer amount (e.g., dollar amount) that the sender 106 may wish to transfer to the recipient 108. Additionally, the secure wallet processing module 204 may be configured to collect data associated with one or more linked financial accounts that may be associated with the sender 106 and the recipient 108 from the user profiles 130a, 130b stored within the user data repository 124.

The method 300 may proceed to block 308, wherein the method 300 may include generating a private key 112a for the sender 106 and a private key 112b for the recipient 108 of the financial transaction. In an exemplary embodiment, the key execution module 206 of the secure transaction application 104 may utilize the encrypted key generator 128 to generate the private key 112a that may be associated with the sender 106 and the private key 112b that may be associated with the recipient 108. The encrypted key generator 128 may electronically generate the private keys 112a, 112b with a numerical encrypted key code or an alpha numerical encrypted key code that may not be publically accessible.

The method 300 may proceed to block 310, wherein the method 300 may include passing the private keys 112a, 112b associated with the sender 106 and the recipient 108 for secure validation of the financial transaction. In an exemplary embodiment, upon the generation of the private keys 112a, 112b, the key execution module 206 may be configured to exchange the private keys 112a, 112b as ownership credentials to securely validate the financial transaction as a secure transaction between the sender 106 and the recipient 108. In one configuration, the key execution module 206 may utilize the communication unit 126 to transfer the sender's private key 112a to the recipient 108 to be authenticated without the sender 106 and/or the recipient 108 being able to view the private key 112a. Likewise, the key execution module 206 may utilize the communication unit 126 to transfer the recipient's private key to the sender 106 to be authenticated without the sender 106 and/or the recipient 108 being able to view the private key 112b. The key execution module 206 may also be configured to encrypt the respective private keys 112a, 112b to financial records that are associated with the financial transaction.

The method 300 may proceed to block 312, wherein the method 300 may include communicating transaction data to complete the transaction using blockchain. In an exemplary embodiment, upon the exchange of private keys 112a, 112b and the encryption of the private keys 112a, 112b to the financial records that are associated with the financial transaction, the transaction execution module 208 may be configured to designate the financial transaction as a secure transaction between the sender 106 and the recipient 108.

In one embodiment, upon designated the financial transaction as a secure transaction, the transaction execution module 208 may be configured to access the secure wallet 110 stored within the secure encrypted data environment 122. The transaction execution module 208 may be configured to analyze the secure wallet 110 stored upon the secure encrypted data environment 122 to retrieve the transaction data to be further communicated to the blockchain.

In one configuration, the key execution module 206 may be configured to utilize the encrypted key generator 128 to process a public key 114 that may be passed to the blockchain technology provider(s). Upon the processing of the public key 114, the key execution module 206 may store the public key 114 upon the secure encrypted data environment 122. In one embodiment, the key execution module 206 may access the public key 114 and may update the public key 114 with transaction data associated with the financial transaction between the sender 106 and the recipient 108. In some configurations, the key execution module 206 may be configured to update the public key 114 with some select information (e.g., user information) from the private keys 112a, 112b.

In an exemplary embodiment, upon the processing and updating of the public key 114, the transaction execution module 208 may be configured to pass the public key 114 to the blockchain infrastructure 116 to pass the financial transaction through the blockchain technology to complete the secure transaction in an encrypted and secure manner using blockchain. In particular, the transaction execution module 208 may be configured to utilize the communication unit 126 of the secure server 102 to communicate the transaction data and the public key 114 to the blockchain infrastructure 116.

The transaction data associated with the financial transaction between the sender 106 and the recipient 108 may be further verified through blockchain technologies to complete secure payment of funds from one or more financial accounts associated with the sender 106 to one or more financial accounts associated with the recipient 108. Accordingly, the secure transaction application 104 may ensure that the financial transaction between the sender 106 and the recipient 108 is securely validated from an initiation point to a final payment point.

Figure 4:
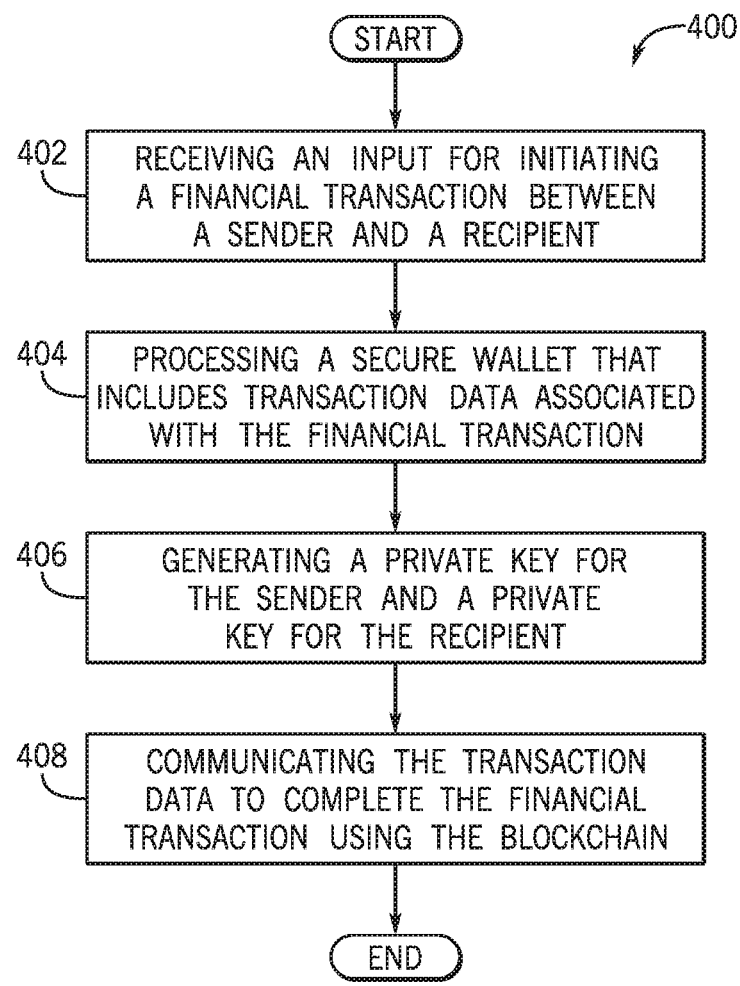
FIG. 4 is a process flow diagram of a method for secure a private key transaction with blockchain according to an exemplary embodiment of the present disclosure.

FIG. 4 is a process flow diagram of a method 400 for secure a private key transaction with blockchain according to an exemplary embodiment of the present disclosure. FIG. 4 will be described with reference to the components of FIG. 1 and FIG. 2, through it is to be appreciated that the method 400 of FIG. 4 may be used with additional and/or alternative system components. The method 400 may begin at block 402, wherein the method 400 may include receiving an input for initiating a financial transaction between a sender 106 and a recipient 108.

The method 400 may proceed to block 404, wherein the method 400 may include processing a secure wallet 110 that includes transaction data associated with the financial transaction. The method 400 may proceed to block 406, wherein the method 400 may include generating a private key 112a for the sender 106 and a private key 112b for the recipient 108. In one embodiment, the private keys 112a, 112b are securely exchanged for secure validation of the financial transaction. The method 400 may proceed to block 408, wherein the method 400 may include communicating the transaction data to complete the financial transaction using the blockchain.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method performed by a server for securing a private key transaction within a blockchain, the method comprising:
   receiving an input for initiating a financial transaction between a sender and a recipient;
   processing a secure wallet as an encrypted data packet that is configured to store transaction data associated with the financial transaction;
   generating a first private key for the sender and a second private key for the recipient;

exchanging the first and second private keys by transmitting the first private key as encrypted application data to the recipient and by transmitting the second private key as encrypted application data to the sender;

encrypting the first and second private keys to financial records that are associated with the financial transaction between the sender and the recipient;

determining successful exchange of the first and second private keys and encryption of the first and second private keys to the financial records associated with the financial transaction between the sender and the recipient;

determining that the financial transaction is securely validated, in response to said determining successful exchange of the first and second private keys and encryption of the first and second private keys to the financial records associated with the financial transaction between the sender and the recipient;

updating a public key with the transaction data associated with the financial transaction; and in response to said determining that the financial transaction is securely validated, accessing the secure wallet upon the secure validation and communicating the transaction data and the public key to a blockchain infrastructure to complete the financial transaction using the blockchain.

2. The computer-implemented method of claim 1, wherein receiving the input for initiating the financial transaction includes presenting a user interface to the sender and the recipient, wherein the user interface allows the sender to input a monetary transfer amount to be transferred to the recipient.

3. The computer-implemented method of claim 2, wherein processing the secure wallet includes determining that the recipient approves the monetary transfer amount and processing the secure wallet as the encrypted data packet that includes a monetary transfer amount that the sender is securely sending to the recipient.

4. The computer-implemented method of claim 2, wherein processing the secure wallet includes accessing a secure encrypted data store and storing the secure wallet within the secure encrypted data store, wherein secure encrypted data is accessible based on a selectively and randomly encrypted passcode.

5. The computer-implemented method of claim 2, wherein processing the secure wallet includes collecting transaction information associated with the monetary transfer amount and data associated with at least one linked financial account and storing transaction data that includes the transaction information within the secure wallet.

6. The computer-implemented method of claim 1, wherein generating the first private key and the second private key includes utilizing an encrypted key generator to generate the first and second private keys, wherein the first and second private keys are generated with a numerical encrypted key code.

7. The computer-implemented method of claim 1, further including passing the first private key associated with the sender and the second private key associated with the recipient for the secure validation of the financial transaction.

8. The computer-implemented method of claim 1, further including generating the public key that is passed through the blockchain to complete the financial transaction.

9. The computer-implemented method of claim 8, wherein communicating the transaction data to complete the financial transaction includes communicating the transaction data and the public key to the blockchain infrastructure to complete the financial transaction.

10. A system for securing a private key transaction within a blockchain, the system comprising:

a processor;

a memory storing instructions that, when executed by the processor cause the processor to:

receive an input for initiating a financial transaction between a sender and a recipient;

process a secure wallet as an encrypted data packet that is configured to store transaction data associated with the financial transaction;

generate a first private key for the sender and second a private key for the recipient;

exchange the first and second private keys by transmitting the first private key as encrypted application data to the recipient and by transmitting the second private key as encrypted application data to the sender;

encrypt the first and second private keys to financial records that are associated with the financial transaction between the sender and the recipient;

determine successful exchange of the first and second private keys and encryption of the first and second private keys to the financial records associated with the financial transaction between the sender and the recipient;

determine that the financial transaction is securely validated, in response to said determining successful exchange of the first and second private keys and encryption of the first and second private keys to the financial records associated with the financial transaction between the sender and the recipient;

update a public key with the transaction data associated with the financial transaction; and in response to said determining that the financial transaction is securely validated, access the secure wallet upon the secure validation and communicate the transaction data and the public key to a blockchain infrastructure to complete the financial transaction using the blockchain.

11. The system of claim 10, wherein receiving the input for initiating the financial transaction includes presenting a user interface to the sender and the recipient, wherein the user interface allows the sender to input a monetary transfer amount to be transferred to the recipient.

12. The system of claim 11, wherein processing the secure wallet includes determining that the recipient approves the monetary transfer amount and processing the secure wallet as the encrypted data packet that includes a monetary transfer amount that the sender is securely sending to the recipient.

13. The system of claim 11, wherein processing the secure wallet includes accessing a secure encrypted data store and storing the secure wallet within the secure encrypted data store, wherein secure encrypted data is stories accessible based on a selectively and randomly encrypted passcode.

14. The system of claim 11, wherein processing the secure wallet includes collecting transaction information associated with the monetary transfer amount and data associated with at least one linked financial account and storing transaction data that includes the transaction information within the secure wallet.

15. The system of claim 10, wherein generating the first private key and the second private key includes utilizing an encrypted key generator to generate the first and second private keys, wherein the first and second private keys are generated with a numerical encrypted key code.

16. The system of claim 10, further including passing the first private key associated with the sender and the second private key associated with the recipient for the secure validation of the financial transaction.

17. The system of claim 10, further including generating the public key that is passed through the blockchain to complete the financial transaction.

18. The system of claim 17, wherein communicating the transaction data to complete the financial transaction includes communicating the transaction data and the public key to the blockchain infrastructure to complete the financial transaction.

19. A non-transitory computer readable storage medium storing instructions that when executed by a computer, which includes a processor, causes the computer to perform a method for securing a private key transaction within a blockchain, the method comprising:

receiving an input for initiating a financial transaction between a sender and a recipient;

processing a secure wallet as an encrypted data packet that is configured to store transaction data associated with the financial transaction;

generating a first private key for the sender and a second private key for the recipient;

exchanging the first and second private keys by transmitting the first private key as encrypted application data to the recipient and by transmitting the second private key as encrypted application data to the sender;

encrypting the first and second private keys to financial records that are associated with the financial transaction between the sender and the recipient;

determining successful exchange of the first and second private keys and encryption of the first and second private keys to the financial records associated with the financial transaction between the sender and the recipient;

determining that the financial transaction is securely validated, in response to said determining successful exchange of the first and second private keys and encryption of the first and second private keys to the financial records associated with the financial transaction between the sender and the recipient;

updating a public key with the transaction data associated with the financial transaction; and in response to said determining that the financial transaction is securely validated, accessing the secure wallet upon the secure validation and communicating the transaction data and the public key to a blockchain infrastructure to complete the financial transaction using the blockchain.

20. The non-transitory computer readable storage medium of claim 19, further including generating the public key that is passed through the blockchain to complete the financial transaction.

* * * * *